US006907776B2

United States Patent
Fischer et al.

(10) Patent No.: US 6,907,776 B2
(45) Date of Patent: Jun. 21, 2005

(54) SYSTEM AND METHOD FOR DETECTION OF PRESSURE DROP IN A TIRE

(75) Inventors: Martin Fischer, Regensburg (DE); Dominik Fuessel, Dietzenbach (DE); Franz Hillenmayer, Burglengenfeld (DE)

(73) Assignee: Siemens Aktiengesellschaft, München ( * ) Notice: Subject to any disclaimer, the term of this patent is extended or adjusted under 35 U.S.C. 154(b) by 124 days.

(21) Appl. No.: 10/237,124

(22) Filed: Sep. 9, 2002

(65) Prior Publication Data

US 2003/0070477 A1 Apr. 17, 2003

(30) Foreign Application Priority Data

Sep. 10, 2001 (DE) .......................................... 101 44 328

(51) Int. Cl.[7] ............................................. G01M 17/02
(52) U.S. Cl. ........................ 73/146; 340/442; 340/440; 340/444
(58) Field of Search ........................... 73/146; 340/440, 340/442, 444

(56) References Cited

U.S. PATENT DOCUMENTS

| 4,567,459 | A | 1/1986 | Folger et al. |
| 5,335,540 | A | 8/1994 | Bowler et al. |
| 5,886,624 | A | 3/1999 | Herbert |
| 6,545,599 | B2 * | 4/2003 | Derbyshire et al. ......... 340/442 |
| 6,622,553 | B2 * | 9/2003 | Hayashi et al. ............... 73/146 |
| 6,624,748 | B1 * | 9/2003 | Phelan et al. ............... 340/442 |

FOREIGN PATENT DOCUMENTS

| DE | 30 29 563 C3 | 2/1982 |
| DE | 39 33 434 A1 | 4/1991 |
| DE | 692 02 982 T2 | 2/1993 |

OTHER PUBLICATIONS

Derwent Abstract, German Patent No. DE3933434, publication date Apr. 11, 1991.

* cited by examiner

Primary Examiner—Edward Lefkowitz
Assistant Examiner—Andre Allen
(74) Attorney, Agent, or Firm—Jacob Eisenberg Siemens AG

(57) ABSTRACT

The present invention comprises a system for the detection of a pressure drop in a tire. Herein an evaluating unit determines the temporal modification of the temperature in the tire and produces an alerting signal if the temporal modification of the temperature falls short of a predetermined temperature modification threshold value. In presence of an evaluating signal, the evaluating unit determines the temporal modification of the air pressure and produces an alerting signal, if the temporal modification of the air pressure exceeds an air pressure modification threshold value.

21 Claims, 2 Drawing Sheets

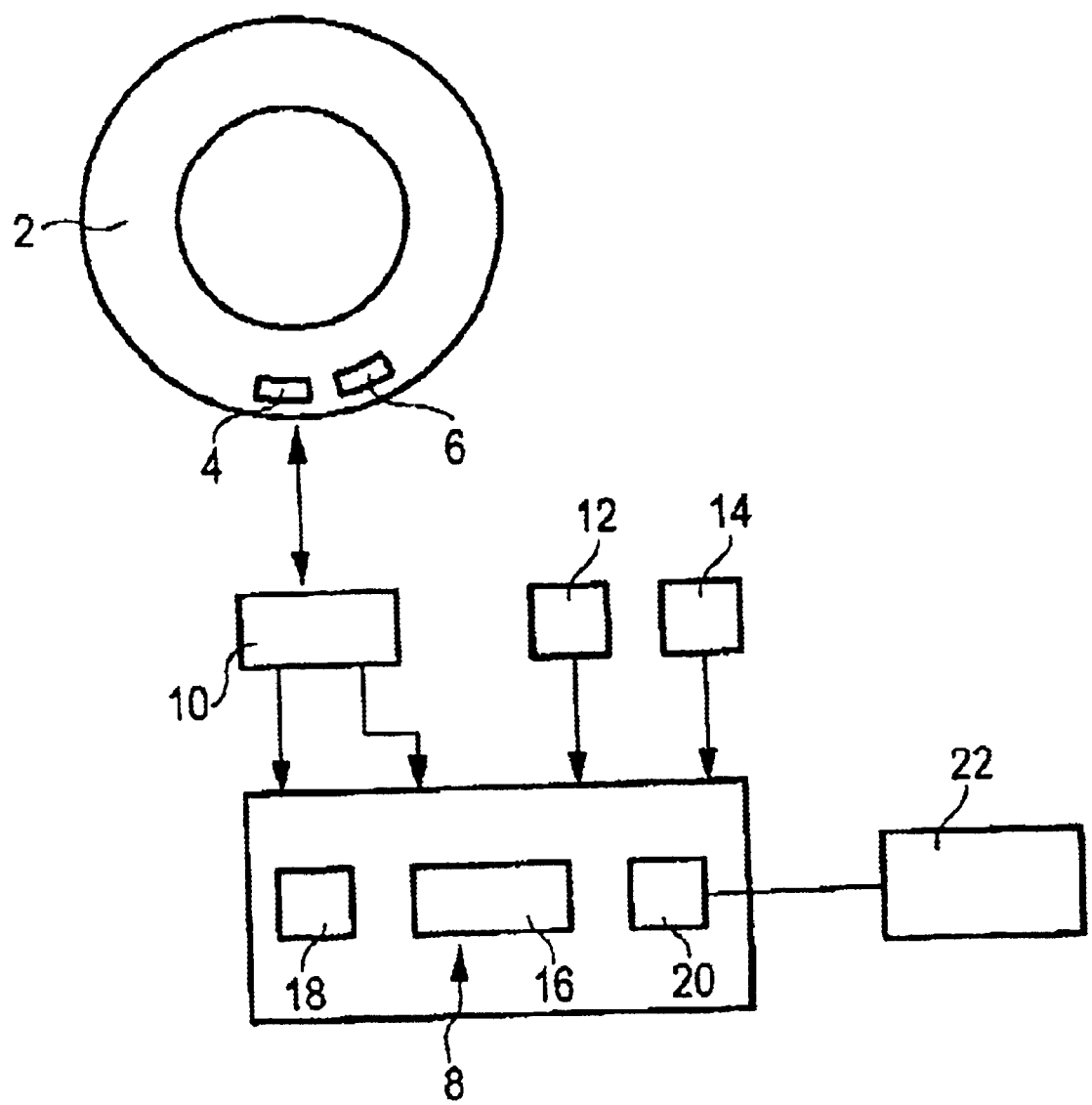

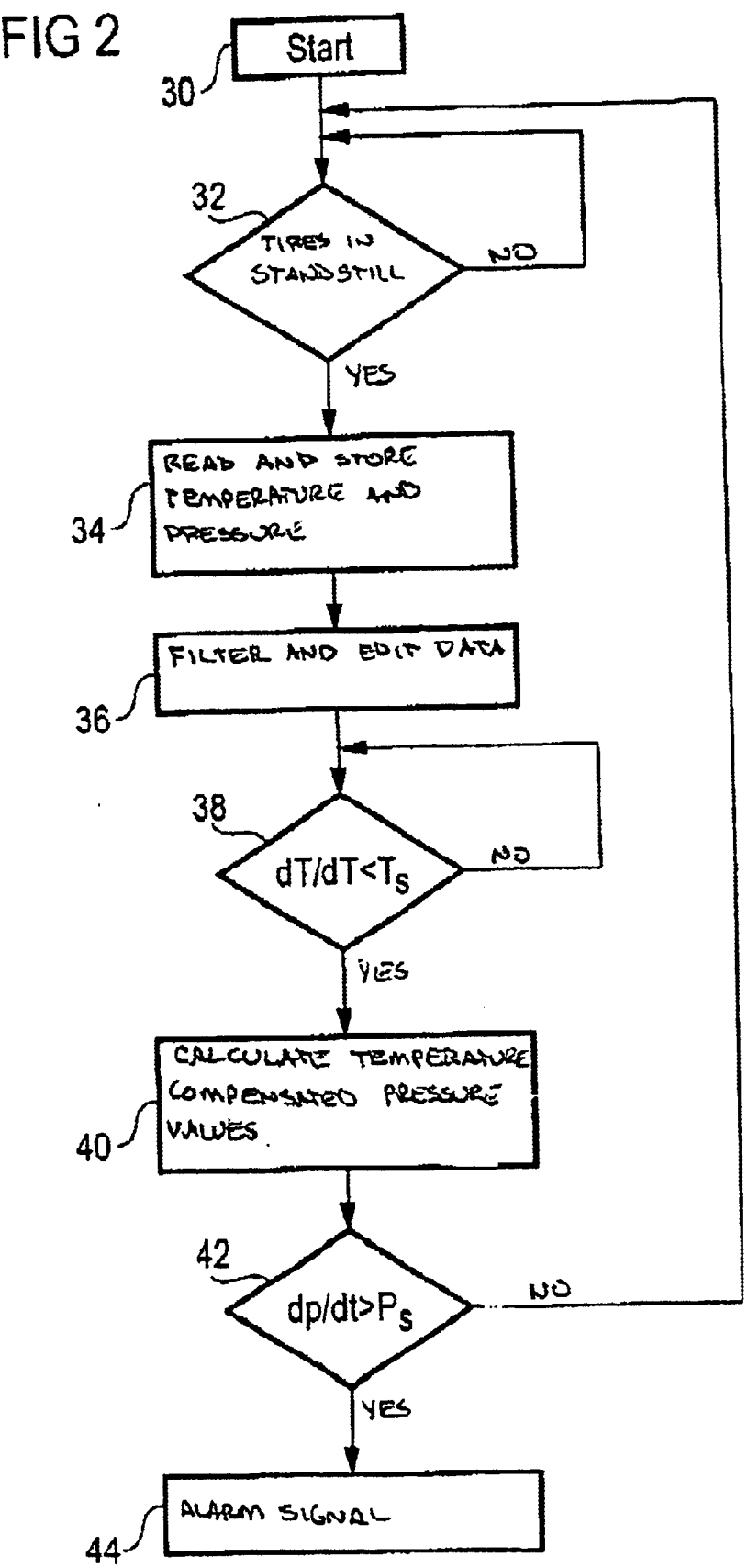

SYSTEM AND METHOD FOR DETECTION OF PRESSURE DROP IN A TIRE

CROSS REFERENCE TO RELATED APPLICATIONS

The present application claims the benefit of priority German Application number, 101 44 328.5 filed Sep. 10, 2001, which is incorporated herein by reference.

BACKGROUND OF THE INVENTION

The present invention relates to the field of pneumatic tire air pressure maintenance and more particularly to a system and method for the detection of a pressure drop in a tire. The tire may be a pneumatic tire belonging to a vehicle, such as a truck, automobile, motorcycle, aircraft and the like.

A current system for detecting pressure drops is known from U.S. Pat. No. 5,895,846. Herein, a system is set out in which air pressure and temperature inside the tire are periodically measured. The measured air pressure is corrected according to the measured temperature and an alarm is generated if the temperature corrected air pressure changes by a particular degree over a particular period of time.

Temperature within a tire is influenced by many factors, including: velocity of the vehicle; direction of the vehicle—curved, straight, etc.; temperature of the street surface; solar radiation; and so forth. As such, a rather high uncertainty exists regarding the homogeneity of the temperature inside the tire, and therefore, the actual temperature within the tire as indicated by an internal temperature sensor. As such, a temperature compensation of measured internal air pressure is likewise effected by the uncertainty. Accordingly, a need exists for more effective temperature based tire air pressure compensation.

SUMMARY OF THE INVENTION

It is an advantage of the present invention to provide a system and method for improved detection of an air pressure drop in a tire resulting in reduced utility and/or possible danger from use or continued use of the tire. It is a still a further advantage to provide a warning for several stages of reduced utility and danger. It is another advantage to consider ambient factors in the determination of utility and danger. It is still another advantage to have a broad application of the present system and method to cover a variety of pneumatic tires in a variety of uses. Further still, an advantage lies in increased detection sensitivity as air pressure drops to reduced utility and/or dangerous levels. These and other advantages will become clear from the detailed description and claims below.

The present invention comprises a system and method wherein temporal modification of air pressure as may result in alarm generation is only evaluated if the temporal modification of the tire's internal temperature lies below a predetermined temperature modification threshold value. The basis for this comes from the assumption that ambient temperatures do not effect readings if the temporal modifications of air pressure are above the threshold. Hence, any detected air pressure drops must be due to escaping air.

The present invention further comprises a method for detecting pressure drop in a tire of a vehicle, comprising the steps of: measuring air pressure and temperature within said tire, determining a temporal modification of said temperature and whether said modification is below a predetermined temperature modification threshold, and if said temperature temporal modification is below a predetermined threshold, generating an alarm if temporal modification of measured air pressure exceeds an air pressure modification threshold value.

The present invention further comprises a system for the detection of a pressure drop in a tire of a vehicle, comprising: an air pressure sensor for detecting air pressure in said tire, a temperature sensor for detecting temperature in said tire; an alarm unit for generating a human detectable alarm; and an evaluating unit electrically connected to said air pressure sensor, temperature sensor and alarm unit, said unit further comprising means for: determining temporal modification of detected temperature and producing an evaluating signal if said temporal modification falls below a predetermined temperature modification threshold value; determining said temporal modification of air pressure in the presence of said evaluating signal and producing an alarm signal in said alarm unit if temporal modification of detected air pressure exceeds an air pressure modification threshold value.

BRIEF DESCRIPTION OF THE SEVERAL VIEWS OF THE DRAWINGS

The novel features and method steps believed characteristic of the invention are set out in the claims below. The invention itself, however, as well as other features and advantages thereof, are best understood by reference to the detailed description, which follows, when read in conjunction with the accompanying drawing, wherein:

FIG. 1 depicts a system according to an embodiment of the invention; and

FIG. 2 depicts a method flow chart according to an embodiment of the invention.

DETAILED DESCRIPTION OF THE INVENTION

As depicted in FIG. 1, an air pressure sensor 4 for the detection of air pressure within vehicle tire 2 and temperature sensor 6 for the detection of temperature within tire 2 are placed within the vehicle tire. Structure and function of the sensors are known to one skilled in the art. The air pressure sensor 4 does not have to be placed immediately within the interior space of the tire, it can also be placed at a valve so that the pressure-sensitive element of the pressure sensor 4 detects the interior pressure of the tire. The detected temperature by temperature sensor 6 should be little influenced by the wall of the tire itself. Therefore, the temperature sensor 6 can be placed, for example, thermally insulated at the rim. If the pressure sensor 4 is placed at the valve and the temperature sensor 6 not at the interior wall of the tire but at the rim, the tire itself is not affected by the sensors. It is also possible to place both sensors at the valve or at the rim.

The output signals of sensors 4 and 6 are transmitted to an evaluating unit 8. Depending upon the structure and arrangement of the sensors, this may occur as follows: mechanically by sliding contact; wirelessly in generally known ways such as inductively, capacitively, unidirectionally by radio, or bidirectionally by transponders which communicate with a sending/receiving unit 10 which further edits the signals sent from the assigned transponders by the sensors and supplies input to evaluating unit 8. An ambient air pressure sensor 12 and a velocity sensor 14 are connected to the inputs of the evaluating unit 8 as well. The evaluating unit 8 comprises a microprocessor 16 with a program memory 18 and a data memory 20. An output of the evaluating unit 8 is connected to an alarm unit 22, which may comprise a warning light or a display in a vehicle switchboard with possible additional acoustic output.

The inventive method and operation of the above described system will now be set out with respect to FIG. 2. The method starts at step 30 and proceeds to step 32 where it is determined according to velocity sensor 34 whether the vehicle whose tires are being analyzed are stationary. If the vehicle is in motion, a new immobilizing inspection is carried out. If the vehicle is stationary, pressure and temperature values supplied by the sensors 4 and 6 are read and stored into data memory 20 (step 34). The stored signals are filtered and edited in step 36 to suppress momentary fluctuations, interferences, and the like. In step 38, a determination is made whether the temporal temperature modification dT/dt is smaller than a temperature modification threshold value $T_s$. Different methods are applicable for this determination: several temperature values can for example be each detected in chronological order and the defined modification can be evaluated from a predetermined number of preceding temperature values accordingly; alternatively, only the temperature modification can be evaluated during two consecutive measurements; and so on. If the temperature modification lies below the temperature modification threshold value $T_s$, a signal is produced that the thermal equilibrium or at least the approximate thermal equilibrium has been obtained in the tire so that the prevailing air pressure is not influenced anymore by momentary temperature fluctuations.

If the temporal temperature modification, determined in step 38, lies below the temperature modification threshold value $T_s$, an evaluation signal is generated and the method continues to step 40. In step 40, temperature compensated pressure values, from the continuously further read pressure values, are calculated while the respective pressure is converted into a reference pressure at the reference temperature corresponding to the ratio between the respective absolute temperature and an absolute reference temperature. Further, the temporal modification of the temperature compensated pressure values is calculated in step 40. It is determined in step 42 if the temporal modification dp/dt is greater than a predetermined pressure modification threshold value. If this is not the case, the system returns to step 32. If this is the case, an alarm signal is generated at step 44 which produces a warning to the driver via the alarm unit.

The present system and method also apply to stationary vehicles and those without an engaged ignition. In the latter instance, an unacceptable pressure drop in a tire is communicated to the driver when the vehicle is started. As soon as the respective evaluating signal goes out, i.e. the temporal temperature modification lies above Ts, the pressure modification evaluation will be terminated.

The system and in particular the method according to the invention can be modified in many different ways. Herein, the temporal modification of the air pressure, for example its temperature compensated absolute value, can be evaluated and an alerting signal can be produced if the absolute value falls below a threshold value. Temperature compensation of air pressure is usually only necessary when the measured temperature changes influence the air pressure beyond a preset tolerance. However, temperature compensation by rule, regardless of tolerances, does lead to more accurate readings and analysis.

Step 32 is not mandatory, because the system can also operate on a moving vehicle if a sufficient thermal equilibrium can be regulated, as may be for example for a truck driving with a constant velocity.

In an alternate embodiment, the ambient air pressure sensor 12 (FIG. 1) is optional. If present, the air pressure detected by the sensor 4 is corrected before its evaluation according to the influence of the measured ambient air pressure (sensor 12) on the interior air pressure of the tire. The air pressure modification threshold value $P_s$ can depend on the measured, and if necessary corrected, tire air pressure in such a way that it becomes lower with increasing distance between the tire air pressure and a target air pressure—the target air pressure being for example an optimal air pressure within the tire. The sensitivity of the system is thereby increased at low, increasingly dangerous tire air pressures. Further, the output signal of the velocity sensor 14 may not only be applied for the recognition of an immobilized vehicle, but, as long as the system continues to function as a driving vehicle, for the correction of the measured tire air pressure corresponding to the driving speed. The tire air pressure is generally not only influenced by the driving speed due to a temperature rise but due to a mechanical deformation of the tire as well. To this end, it is necessary to determine vehicle operating speed and deformation through appropriately placed sensors and interfacing them with the evaluating unit in order to perform the necessary steps to adjust the tire air pressure determinations accordingly.

The system can be structured in such a way, that an indication is made to the driver at a time when a pressure evaluation has taken place, so that the drive may be reassured that the system is operational and tire pressure is in order. Per the present invention, sensors may be preferably provided at all the tires of a vehicle. In still a further embodiment, the temporal pressure drop can be extrapolated in the evaluating unit and a time can be calculated, to which the pressure has dropped to an unacceptably low pressure as well as below select levels of varying degree of operational safety. The select levels need be extrapolated for the individual tires, vehicles and use characteristics. This time may be displayed along with an alarm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for detecting pressure drop in a tire of a vehicle, comprising the steps of:
   measuring air pressure and temperature within said tire,
   determining a temporal modification of said temperature and whether said modification is below a predetermined temperature modification threshold,
   if said temperature temporal modification is below a predetermined threshold, generating an alarm if temporal modification of measured air pressure exceeds an air pressure modification threshold value, and
   decreasing said air pressure modification threshold value with increasing range between measured air pressure and target air pressure.

2. The method according to claim 1, wherein said temporal modification of said air pressure is only evaluated if said vehicle is stationary.

3. The method according to one of the claim 1, wherein said measured air pressure is corrected according to measured temperature.

4. The method according to one of the claim 2, wherein said measured air pressure is corrected according to measured temperature.

5. The method according to claim 1, further comprising the steps of:
- extrapolating various degrees of operating safety levels of said tire;
- determining if measured air pressure falls below any one of said safety levels; and
- generating an alarm if said air pressure falls below any one of said safety levels.

6. The method according to claim 5, further comprising the steps of:
- determining rate in which said air pressure falls below a highest of said safety levels;
- extrapolating from said rate a time when said air pressure falls below a lowest of said safety levels; and
- displaying said time when said alarm is generated.

7. The method according to claim 1, further comprising the steps of:
- determining said tire deformation; and
- modifying measured air pressure according to tire deformation.

8. The method according to claim 1, further comprising the steps of:
- determining said vehicle speed; and
- modifying measured air pressure according to vehicle speed.

9. A system for the detection of a pressure drop in a tire of a vehicle, comprising:
- an air pressure sensor for detecting air pressure in said tire,
- a temperature sensor for detecting temperature in said tire;
- an alarm unit for generating a human detectable alarm;
- an evaluating unit electrically connected to said air pressure sensor, temperature sensor and alarm unit, said unit further comprising means for:
- determining temporal modification of detected temperature and producing an evaluating signal if said temporal modification falls below a predetermined temperature modification threshold value; and
- determining said temporal modification of air pressure in the presence of said evaluating signal and producing an alarm signal in said alarm unit if temporal modification of detected air pressure exceeds an air pressure modification threshold value; and
- means for decreasing said air pressure modification threshold value with increasing range between detected air pressure and target air pressure.

10. The system according to claim 9, further comprising:
- a vehicle immobilization sensor for detecting whether a vehicle is in motion, said immobilization sensor connected to said evaluating unit; and
- said evaluating unit further comprising means for determining temporal modification of detected air pressure in regard to production of an alerting signal only when output from said immobilization sensor indicates that said vehicle is stationary.

11. The system according to claim 9, further comprising an ambient air pressure sensor for detecting ambient air pressure, said ambient air pressure sensor connected to said evaluation unit, and said evaluating unit further comprising means for correcting measured air pressure according to detected ambient air pressure.

12. The system according to claim 10, further comprising an ambient air pressure sensor for detecting ambient air pressure, said ambient air pressure sensor connected to said evaluation unit, and said evaluating unit further comprising means for correcting measured air pressure according to detected ambient air pressure.

13. The system according to claim 9, further comprising a velocity sensor for detecting vehicle operating speed, and said evaluating unit further comprising means for correcting measured air pressure according to said operating speed.

14. The system according to one of the claim 10, wherein said unit further comprises means for correcting measured air pressure according to measured temperature.

15. The system according to one of the claim 11, wherein said unit further comprises means for correcting measured air pressure according to measured temperature.

16. The system according to one of the claim 12, wherein said unit further comprises means for correcting measured air pressure according to measured temperature.

17. The system according to one of the claim 13, wherein said unit further comprises means for correcting measured air pressure a according to measured temperature.

18. The system according to claim 9, wherein said evaluation means further comprises means for:
- extrapolating various degrees of operating safety levels of said tire;
- determining if measured air pressure falls below any one of said safety levels; and
- generating an alarm if said air pressure falls below any one of said safety levels.

19. The system according to claim 18, wherein said evaluating unit further comprises means for:
- determining rate in which said air pressure falls below a highest of said safety levels;
- extrapolating from said rate a time when said air pressure falls below a lowest of said safety levels; and
- displaying said time when said alarm is generated.

20. The system according to claim 9, further comprising means for measuring tire deformation in communication with said evaluating means, and wherein said evaluating unit further comprises means for modifying measured air pressure according to tire deformation.

21. The system according to claim 9, further comprising means for detecting vehicle operating speed and wherein said evaluating unit further comprises means for modifying measured air pressure according to vehicle operating speed.

* * * * *